United States Patent
Ariizumi et al.

(10) Patent No.: US 11,514,614 B2
(45) Date of Patent: Nov. 29, 2022

(54) IMAGE PROCESSING APPARATUS, METHOD OF CONTROLLING IMAGE PROCESSING APPARATUS, AND NON-TRANSITORY COMPUTER-READABLE STORAGE MEDIUM

(71) Applicant: CANON KABUSHIKI KAISHA, Tokyo (JP)

(72) Inventors: Masahiro Ariizumi, Nagoya (JP); Tsewei Chen, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 111 days.

(21) Appl. No.: 16/925,801

(22) Filed: Jul. 10, 2020

(65) Prior Publication Data

US 2021/0019917 A1 Jan. 21, 2021

(30) Foreign Application Priority Data

Jul. 16, 2019 (JP) ............................. JP2019-131395

(51) Int. Cl.
*G06T 9/00* (2006.01)
*G06T 7/174* (2017.01)
*G06T 7/00* (2017.01)
*G06T 1/60* (2006.01)

(52) U.S. Cl.
CPC ............... *G06T 9/002* (2013.01); *G06T 1/60* (2013.01); *G06T 7/174* (2017.01); *G06T 7/97* (2017.01)

(58) Field of Classification Search
None
See application file for complete search history.

(56) References Cited

U.S. PATENT DOCUMENTS

| 6,371,603 B1 * | 4/2002 | Seto ................... B41J 2/14201 |
| | | 347/71 |
| 6,371,609 B1 * | 4/2002 | Oikawa ............... B41J 2/04586 |
| | | 347/41 |
| 8,311,089 B2 * | 11/2012 | Ishikawa ........... H04N 21/2365 |
| | | 375/240 |

(Continued)

FOREIGN PATENT DOCUMENTS

JP 2016099707 A 5/2016

OTHER PUBLICATIONS

Xie "Holistically-Nested Edge Detection" Proceedings of International Computer Vision Foundation. 2015: pp. 1395-1403.

(Continued)

*Primary Examiner* — Anand P Bhatnagar
(74) *Attorney, Agent, or Firm* — Rossi, Kimms & McDowell LLP

(57) ABSTRACT

An image processing apparatus comprising, a first processing unit configured to process a first image stored in a first memory and output a first processing result in a first size, a conversion unit configured to, if the first size matches a second size, output the first processing result, and if the first size is different from the second size, convert the first processing result into the second size and output a result of the conversion, and a second processing unit configured to process the first processing result outputted from the conversion unit and a second image of the second size stored in a second memory, and to store a second processing result in the second memory in the second size.

19 Claims, 10 Drawing Sheets

(56) References Cited

U.S. PATENT DOCUMENTS

| | | | | |
|---|---|---|---|---|
| 10,102,664 | B1* | 10/2018 | Payne | G09G 5/397 |
| 10,460,430 | B2* | 10/2019 | Kano | G06T 5/005 |
| 10,685,238 | B2* | 6/2020 | Matsui | G06V 20/53 |
| 10,713,837 | B1* | 7/2020 | Payne | G06T 15/00 |
| 10,999,523 | B2* | 5/2021 | Osawa | G03B 19/12 |
| 2005/0152614 | A1* | 7/2005 | Daly | H04N 19/126 |
| | | | | 382/268 |
| 2012/0237137 | A1* | 9/2012 | Chen | G06T 5/50 |
| | | | | 382/284 |
| 2020/0193585 | A1* | 6/2020 | Ikegami | G06N 20/00 |

OTHER PUBLICATIONS

Hariharan "Object Instance Segmentation and Fine-grained Localization using Hypercolumns" IEEE Transactions an Pattern Analysis and Machine Intelligence. Apr. 1, 2017 vol. 39, Issue 4, pp. 1-14.

* cited by examiner

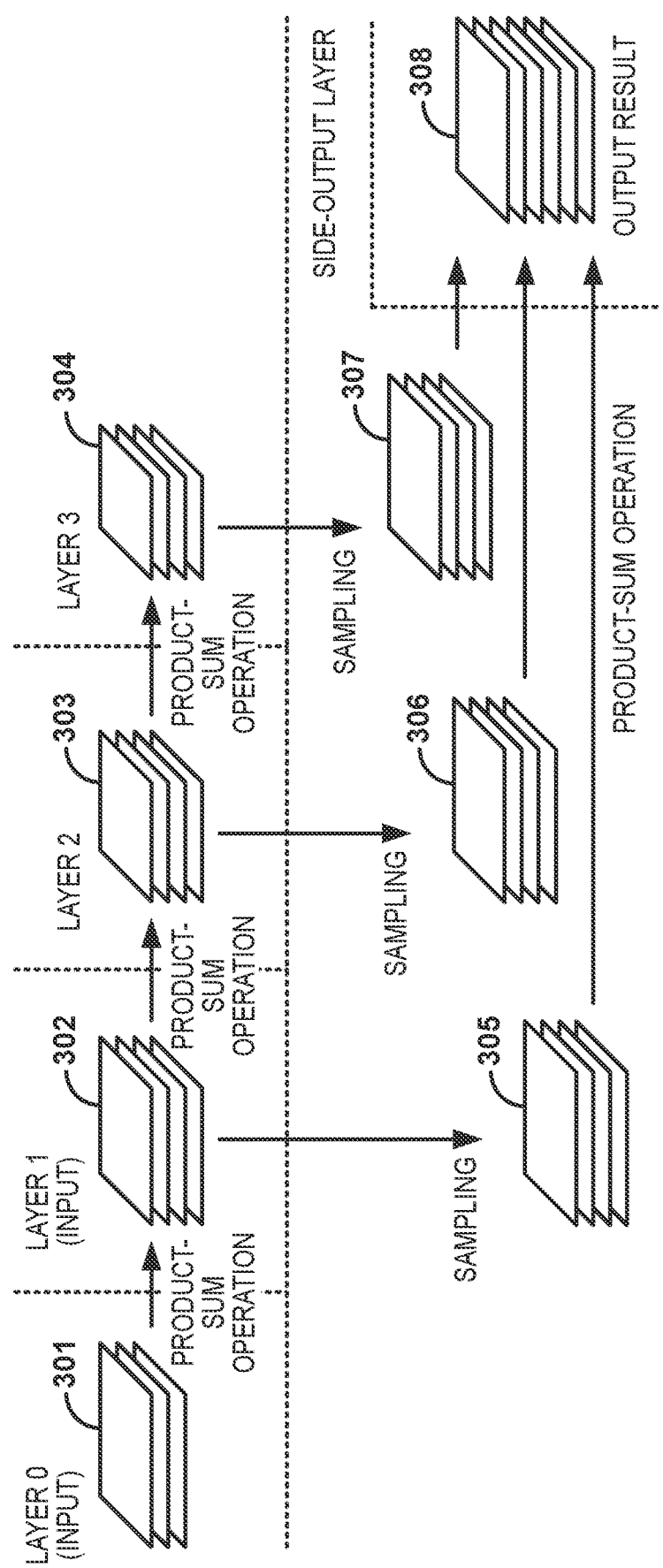

IMAGE PROCESSING APPARATUS, METHOD OF CONTROLLING IMAGE PROCESSING APPARATUS, AND NON-TRANSITORY COMPUTER-READABLE STORAGE MEDIUM

BACKGROUND OF THE INVENTION

Field of the Invention

The present disclosure relates to an image processing apparatus, a method of controlling the image processing apparatus, and a non-transitory computer-readable storage medium.

Description of the Related Art

In recent years, with advances in deep learning, image recognition accuracy has improved. A CNN (Convolutional Neural Network) is known as a technique used for deep learning. A plurality of layers are connected in cascade in the CNN. Each layer incorporates a plurality of feature images and serves to calculate filter processing results by using learnt filter coefficients and the pixels of the feature images. Filter processing is a product-sum operation and includes a plurality of multiplications and cumulative addition.

A feature image (O(.)) in a layer is calculated by using a feature image (I(.)) in the preceding layer and filter coefficients corresponding to the preceding layer. In order to calculate one feature image in a layer, the information of a plurality of feature images in the preceding layer is required. The following is an equation for a convolution operation.

$$O_{i,j}(n) = \sum_{m=1}^{M} \sum_{x=1}^{X} \sum_{y=1}^{Y} (I_{i+x,j+y}(m) \times C_{x,y}(m,n)) \quad (1)$$

The preceding layer incorporates M feature images, and the mth feature image is represented by I(m). There are X×Y filter coefficients ($C_{1,1}(m, n)$ to $c_{X,Y}(m, n)$), which differ depending on each feature image. M×Y×Y product-sum operations are required to calculate an output pixel Oi, j(n) in layer 2. After the convolutional operation is performed, processing such as activation processing and pooling processing is performed using the output pixel Oi, j(n). The CNN requires a large number of product-sum operations, and hence applying the CNN to an embedded system such as a mobile terminal or an on-vehicle device will require an efficient data processing apparatus. Japanese Patent Laid-Open No. 2016-99707 proposes an arrangement configured to perform product-sum operations in each layer of the CNN by using a common parallel computing device.

There is proposed a technique of improving image recognition accuracy by using the feature images in the intermediate layers of a CNN network. As disclosed in Saining Xie, Zhuowen Tu, "Holistically-Nested Edge Detection" in Proceedings of ICCV 2015 and Hariharan B, Arbelaez P, Girshick R, Malik J., "Object Instance Segmentation and Fine-Grained Localization Using Hypercolumns" IEEE Transactions on Pattern Analysis and Machine Intelligence (Volume: 39, Issue: 4, Apr. 1, 2017), a side-output layer is generated using feature images in each layer. The feature images in the side-output layer often differ in size depending on each layer, and hence the sizes of the feature images are matched with the output result by sampling the feature images.

The CNN has many feature images in each layer and requires a large memory to store the feature images. Applying the CNN to an embedded system such as a mobile terminal or an on-vehicle device will require a reduction in memory size.

When the technique disclosed in Japanese Patent Laid-Open No. 2016-99707 is applied to a conventional CNN, the use of a common parallel computing device makes it possible to suppress the cost of a processing apparatus and implement high-speed processing. Note, however, that in order to calculate a plurality of feature images, it is necessary to save feature images in a memory and repeatedly input the same feature image to the parallel computing device.

When the side-output type network disclosed in "Holistically-Nested Edge Detection" and "Object Instance Segmentation and Fine-Grained Localization Using Hypercolumns" described above is applied to the CNN, the feature images in each layer differ in size from the feature images in a side-output layer. Accordingly, it is necessary to perform size conversion to match the feature image size in each layer with that in the side-output layer. In addition, when the feature images after the size conversion are saved in the memory and input to the parallel computing device a plurality of times, a memory is required to save a feature image having the maximum size after the size conversion. Furthermore, when feature images before size conversion are saved in the memory and input to the parallel computing device a plurality of times while performing size conversion, the memory needs to save a feature image having the maximum size before the conversion.

In the side-output type network, both size enlargement and size reduction can occur. Accordingly, this network requires a large memory to save a feature image having the maximum size before reduction when saving feature images before size conversion and to save a feature image having the maximum size after enlargement when saving feature images after size conversion.

SUMMARY OF THE INVENTION

There is provided a technique capable of reducing the size of a memory for storing images in image processing accompanied by image size conversion.

One aspect of embodiments relates to an image processing apparatus comprising, a first processing unit configured to process a first image stored in a first memory and output a first processing result in a first size, a conversion unit configured to, if the first size matches a second size, output the first processing result, and if the first size is different from the second size, convert the first processing result into the second size and output a result of the conversion, and a second processing unit configured to process the first processing result outputted from the conversion unit and a second image of the second size stored in a second memory, and to store a second processing result in the second memory in the second size.

Further features of the invention will become apparent from the following description of exemplary embodiments (with reference to the attached drawings).

BRIEF DESCRIPTION OF THE DRAWINGS

FIG. 3A is a view showing an example of the structure of a general side-output network;

DESCRIPTION OF THE EMBODIMENTS

Figure 1:
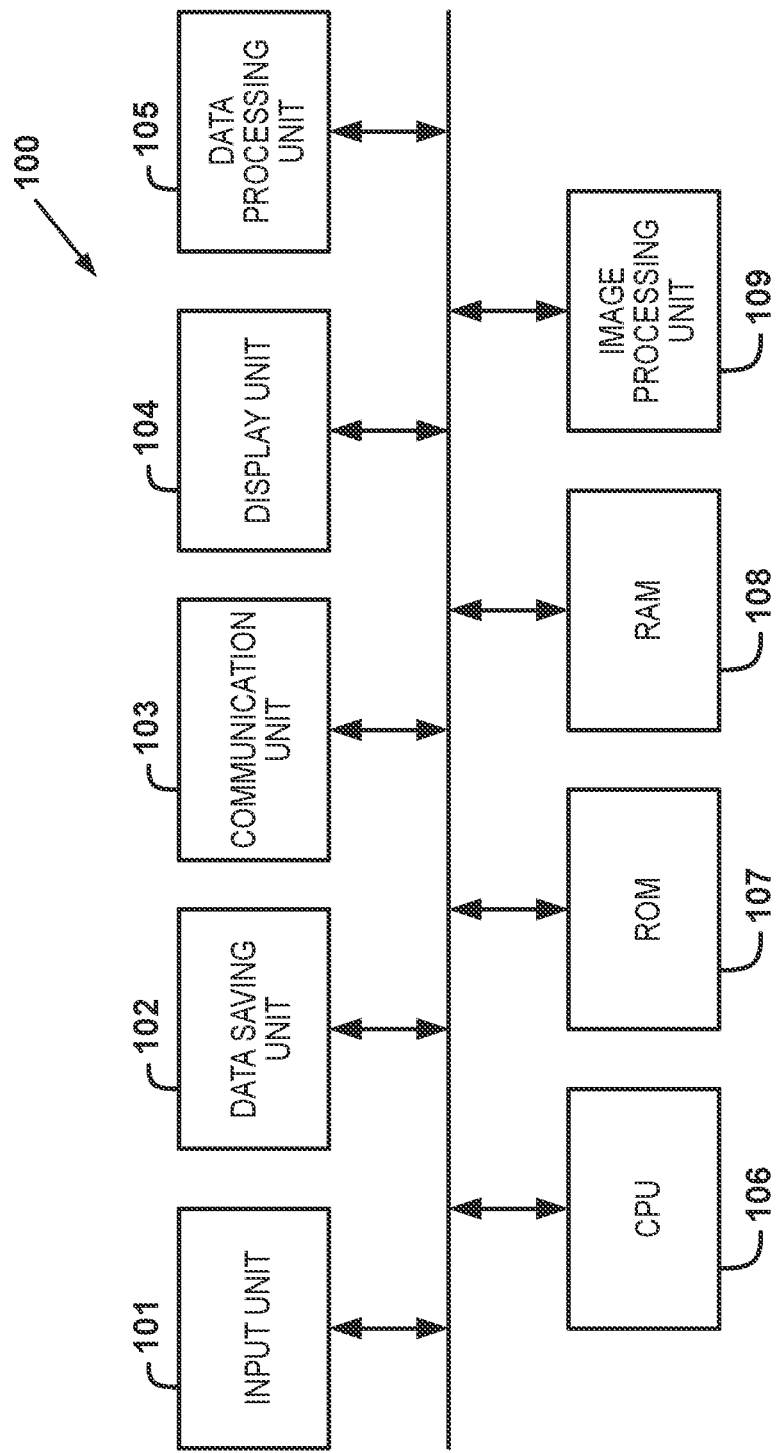
FIG. 1 is a block diagram showing an example of the arrangement of a data processing apparatus 100 according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Embodiments of the present invention will be described in detail below with reference to the accompanying drawings.

<Example of Arrangement of Data Processing Apparatus>

FIG. 1 is a block diagram showing an example of the arrangement of a data processing apparatus 100 according to an embodiment. The following will describe an image processing apparatus that processes input images as the data processing apparatus 100. However, processing targets are not limited to image data and may be audio data or data acquired by other arbitrary sensors.

An input unit 101 is a device that inputs instructions and data from the user and includes a keyboard, mouse, pointer device, and buttons. A data saving unit 102 that saves image data and includes, for example, a hard disk, flexible disk, CD-ROM, CD-R, DVD, memory card, CF card, SmartMedia, SD card, memory stick, xD picture card, and USB memory. The data saving unit 102 can save not only image data but also programs and other data. Alternatively, part of a RAM 108 may be used as the data saving unit 102. In addition, the memory device of an external device connected via a communication unit 103 (to be described later) may be virtually configured to be used via the communication unit 103.

The communication unit 103 is an I/F (interface) for inter-device communication. FIG. 1 shows that the input unit 101, the data saving unit 102, and a display unit 104 are all included in one apparatus. However, these units may be partly connected to the apparatus via communication paths complying with known communication systems. The display unit 104 displays images before and after image processing or images such as a GUI. The display unit 104 may be formed from a CRT, liquid crystal display, or the like, or the display device of an external apparatus connected via a cable or the like may be used. In addition, the display unit 104 and the input unit 101 may be integrated together like a known touch screen device. In this case, input with the touch screen is treated as input with the input unit 101.

Figure 4A:
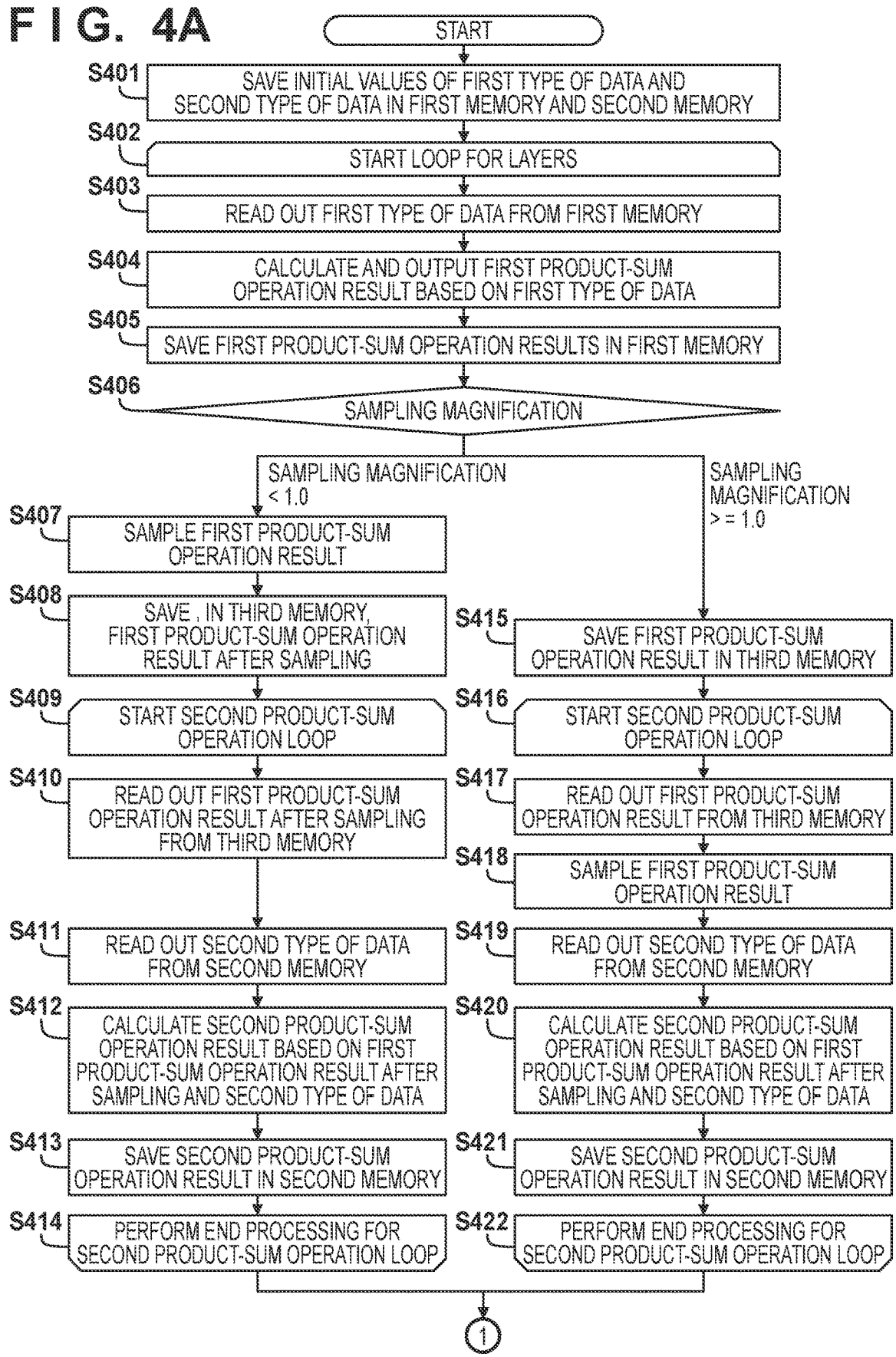
FIGS. 4A and 4B are a flowchart showing an example of processing according to the embodiment.
Figure 4B:
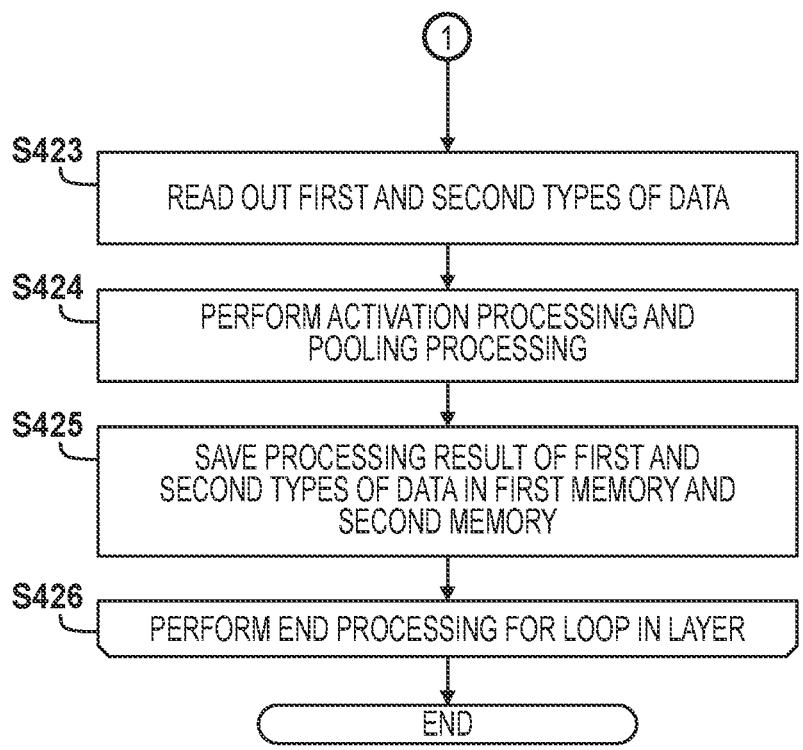

A data processing unit 105 executes data processing (to be described later) (steps S301 to S326) by using the image processing result saved in the RAM 108 in accordance with the flowchart of FIGS. 4A and 4B (to be described later), and outputs the data processing result to the data saving unit 102 (or the RAM 108). A CPU 106 performs image processing or image recognition concerning a moving image (a plurality of frames) based on the data processing result. The image processing or image recognition result obtained by the CPU 106 is saved in the RAM 108. The data processing unit 105 may be formed as hardware using, for example, a dedicated logic circuit and a memory. Alternatively, the data processing unit 105 may be formed as software by causing a computer such as a CPU to execute processing programs stored in the memory.

The CPU 106 functions as a control unit that controls the overall operation of this apparatus. A ROM 107 and the RAM 108 provide the CPU 106 with programs, data, and a work area required for processing executed by the CPU 106. When the programs required for processing (to be described later) are stored in the data saving unit 102 or the ROM 107, the programs are written first in the RAM 108 and then executed. When programs are to be received via the communication unit 103, the programs are recorded first in the data saving unit 102 and then written in the RAM 108 or directly written first from the communication unit 103 into the RAM 108 and then executed.

An image processing unit 109 receives a command from the CPU 106 and reads out image data written in the data saving unit 102. The image processing unit 109 then adjusts the range of pixel values and writes the result in the RAM 108 again.

FIG. 1 shows the arrangement including only one CPU (CPU 106). However, the arrangement may be provided with a plurality of CPUs. In addition, the data processing unit 105 may be constituted by a CPU. Although the system configuration of the apparatus includes various constituent elements other than those described above, a description of them will be omitted because they are irrelevant to the gist of the invention.

Figure 2:
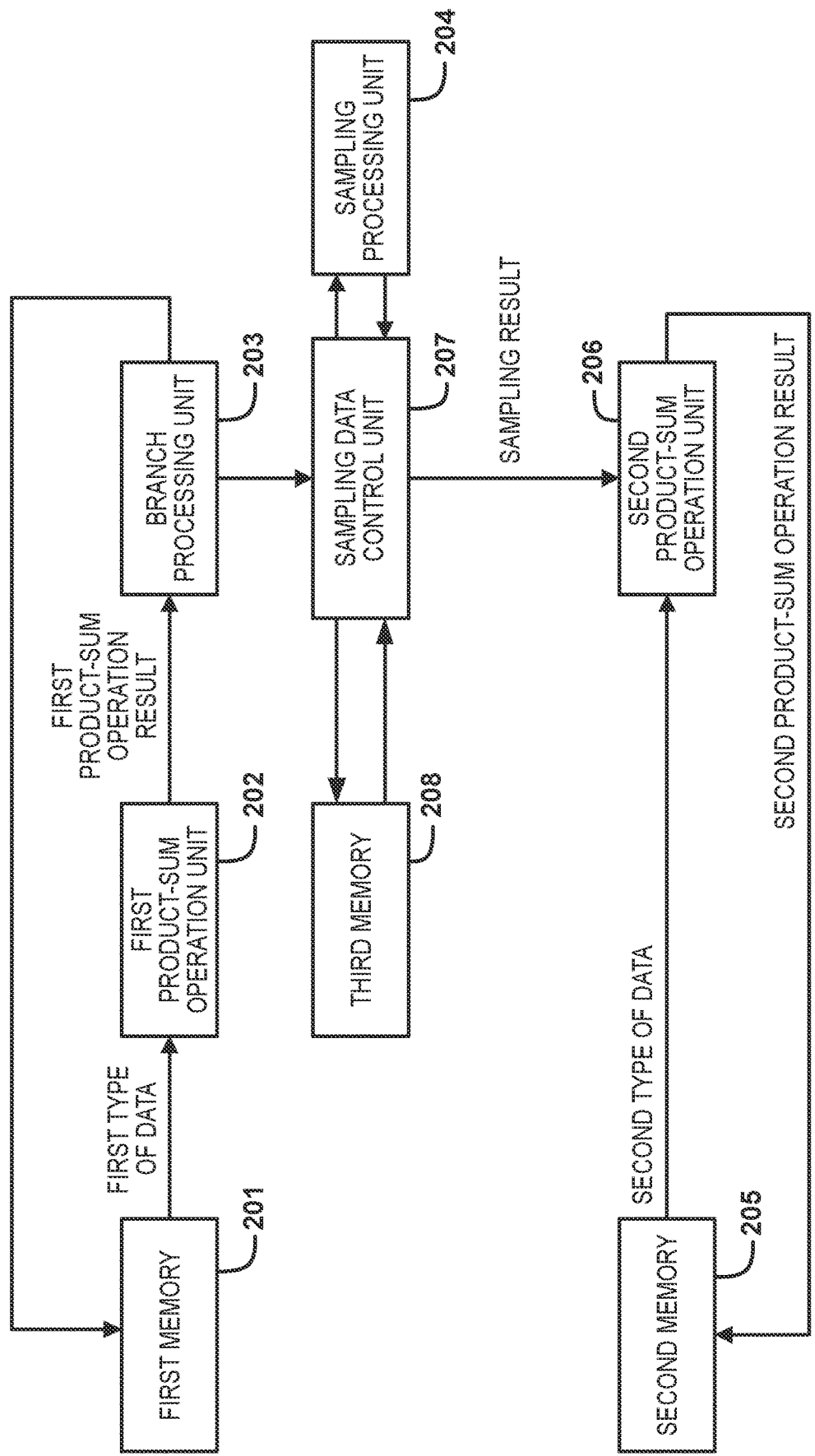
FIG. 2 is a block diagram showing an example of the functional arrangement of a data processing unit 105 according to the embodiment.

The functional arrangement of the data processing unit 105 will be described next with reference to FIG. 2. FIG. 2 shows an example of the functional arrangement of the data processing unit 105 according to this embodiment. The data processing unit 105 is configured to include a first memory 201, a first product-sum operation unit 202, a branch processing unit 203, a sampling processing unit 204, a second memory 205, a second product-sum operation unit 206, a sampling data control unit 207, and a third memory 208.

The first memory 201 is a memory for saving the first type of data (image). The second memory 205 is a memory for saving the second type of data (image). The first product-sum operation unit 202 calculates a first product-sum operation result based on the first type of data. The second product-sum operation unit 206 calculates a second product-sum operation result based on the first type of data and the second type of data. The branch processing unit 203 copies the first product-sum operation result and separately outputs the results. The sampling processing unit 204 samples the first product-sum operation result and outputs the sampling result. The sampling data control unit 207 controls data transfer of the first product-sum operation data and the sampling result in accordance with the sampling magnification set in the sampling processing unit 204. The third memory is a memory for saving either the first product-sum operation result or the sampling result. In addition, there is a comprehensive control unit for the data processing unit 105 (not shown) for controlling each processing unit. Each processing unit operates based on a command from the comprehensive control unit.

Figure 3B:
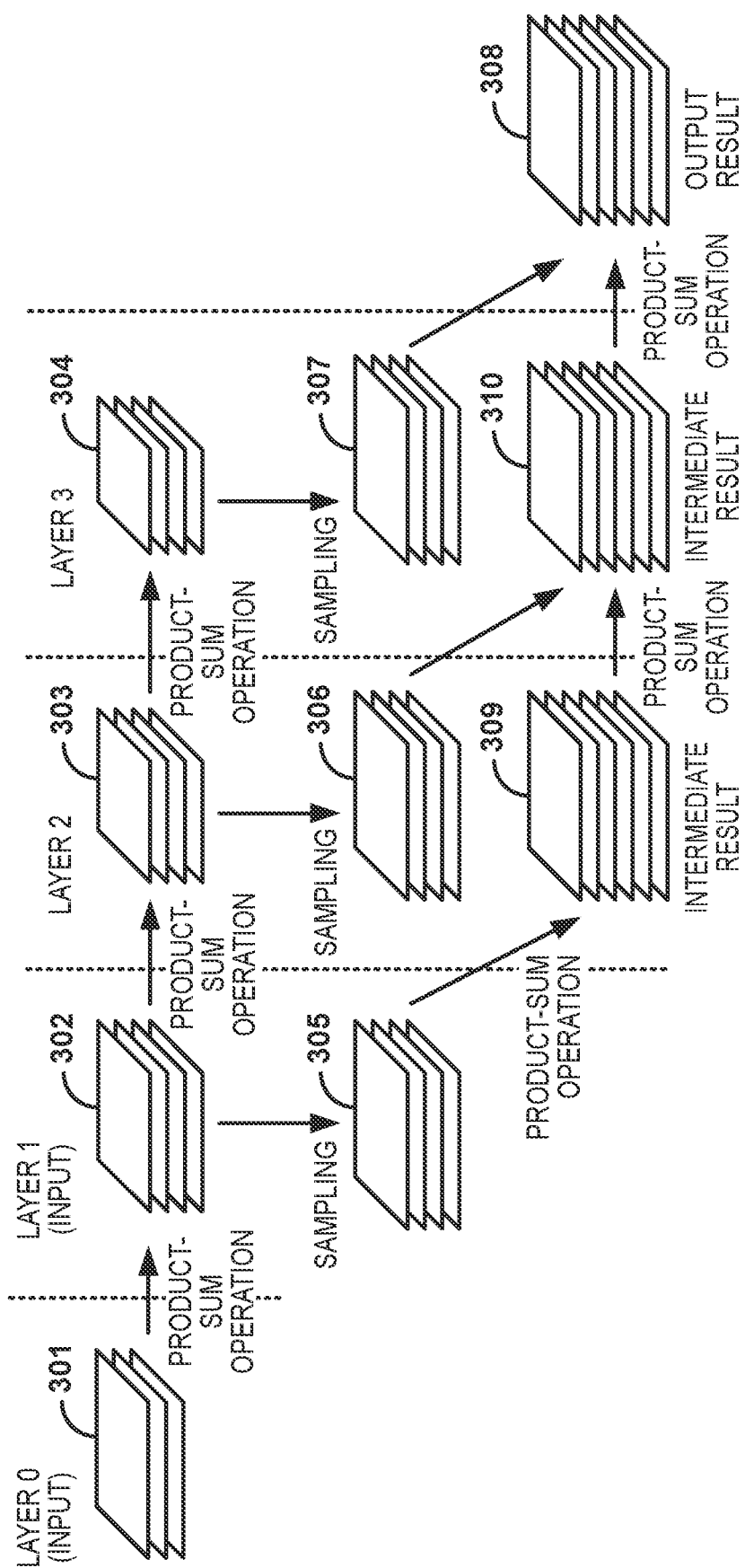
FIG. 3B is a view showing an example of the structure of a side-output network when the data processing apparatus 100 according to the embodiment performs processing.

The structure of the processing target network will be described next with reference to FIGS. 3A and 3B. FIGS. 3A and 3B each show an example of the structure of the processing target network. The network structure includes information such as the calculation amounts of product-sum operations, the size of each feature image, the number of images, and the number of bits. FIG. 3A shows an example of the structure of a general side-output network. In this case, the number of layers is 4 (layers 0 to 3). Each layer incorporates a plurality of feature images.

Calculation concerning layers 0 to 3 will be described first. In layer 0, a product-sum operation is performed by using feature images 301 and filter coefficients to generate feature images 302 in layer 1. The feature images 301 are input images. In layer 1, a product-sum operation is performed by using the feature images 302 and filter coefficients to generate feature images 303 in layer 2. In layer 2, a product-sum operation is performed by using the feature images 303 and filter coefficients to generate feature images 304 in layer 3.

Calculation concerning a side-output layer will be described below. In the side-output layer, the feature images 302 to 304 in layers 1 to 3 are sampled to generate feature images 305 to 307 in the side-output layer which have the same size as that of output results 308, and the generated feature images are saved in the memory. Thereafter, a product-sum operation is performed by using the feature images 305 to 307 in the side-output layer to calculate the output results 308.

FIG. 3B shows an example of the structure of a side-output network when the data processing apparatus 100 according to this embodiment performs processing. The structure shown in FIG. 3B also enables results to be obtained at a similar level to those obtained by the side-output network in FIG. 3A.

Calculation concerning layers 0 to 3 will be described. In layer 0, the first product-sum operation unit 202 performs the first product-sum operation by using feature images 301 and filter coefficients to generate feature images 302 in layer 1. The feature images 301 are input images. In layer 1, the first product-sum operation unit 202 performs the first product-sum operation by using the feature images 302 and filter coefficients to generate feature images 303 in layer 2. The sampling processing unit 204 samples the feature images 302 to generate feature images 305 having the same size as that of output results 308. The second product-sum operation unit 206 performs the second product-sum operation by using the feature images 305 and filter coefficients to generate intermediate results 309 for calculating the output results 308. The intermediate results 309 are treated as feature images in layer 2 and saved in the second memory 205.

In layer 2, the first product-sum operation unit 202 performs the first product-sum operation by using the feature images 303 and filter coefficients to generate feature images 304 in layer 3. The sampling processing unit 204 samples the feature images 303 to generate feature images 306 having the same size as that of the output results 308. The second product-sum operation unit 206 performs the second product-sum operation by using the feature images 306 and filter coefficients to generate intermediate results 310 for calculating the output results 308 based on the intermediate results 309. The intermediate results 310 are treated as feature images in layer 3 and saved in the second memory 205.

In layer 3, the feature images 304 are sampled to generate feature images 307 having the same size as that of the output results 308. The second product-sum operation unit 206 performs the second product-sum operation by using the feature images 307 and filter coefficients to generate the output results 308 based on intermediate results 310.

The output results 308 are divisionally calculated by calculating the intermediate results 309 and 310 in this manner. The feature images 305 and 306 of the side-output layer can be discarded respectively after the calculation of the intermediate results 309 and 310. This procedure is lower in memory cost than when processing the general side-output network and hence is suitable to be implemented in an embedded system.

This embodiment is provided with a sampling processing mechanism that operates concurrently with a product-sum operation, and hence can concurrently process data in different layers. In the case shown in FIG. 3B, first of all, the feature images 302 in layer 1 and the intermediate results 309 in layer 2 are concurrently calculated. The feature images 303 in layer 2 and the intermediate results 310 in layer 3 are then concurrently calculated. Lastly, the feature images 304 in layer 3 and the output results 308 are concurrently calculated.

In this embodiment, the second product-sum operation unit 206 partly and sequentially calculates the intermediate results 309. This makes it necessary to transfer the sampled feature images 305 a plurality of times to calculate the intermediate results 309. This applies to the calculation of the intermediate results 310 and the output results 308. Because sampled feature images need to be transferred a plurality of times, the feature images need to be saved in some form. The embodiment is configured to reduce the memory cost by switching which of feature images before or after sampling should be saved in the memory in accordance with the sampling magnification.

A procedure for data processing executed by the data processing apparatus 100 will be described next with reference to FIGS. 4A and 4B. FIGS. 4A and 4B are a flowchart showing an example of data processing corresponding to the embodiment. The data processing unit 105 executes the processing corresponding to this flowchart. Processing in each step of the flowchart in FIG. 4A and FIG. 4B will be described based on the arrangement of the data processing unit 105 shown in FIG. 2 and an example of the network constituted by three layers (layers 1 to 3) shown in FIG. 5.

In step S401, first of all, the comprehensive control unit in the data processing unit 105 respectively saves the initial values of the first type of data (feature images) and the second type of data (intermediate results) in the first memory 201 and the second memory 205. In the case shown in FIG. 5, the first type of data have a resolution of 120×120, and the second type of data have a resolution of 60×60. The image data saved in the RAM 108 may be used as initial values. In step S402, the comprehensive control unit starts loop processing for the layers and processes the first layer. In step S403, the comprehensive control unit reads out the first type of data from the first memory 201 and inputs the data to the first product-sum operation unit 202. In step S404, the comprehensive control unit causes the first product-sum operation unit 202 to calculate the first product-sum operation result by using the first type of data and filter coefficients, and causes the branch processing unit 203 to copy the one first product-sum operation result to obtain two copied data and output them. In step S405, the comprehensive control unit saves the first product-sum operation results copied by the branch processing unit 203 as the first type of data in the first memory 201.

In step S406, the sampling data control unit 207 determines the sampling magnification of the sampling processing unit 204, and causes the process to branch in accordance with the sampling magnification. A sampling magnification is determined by the first product-sum operation result or the first and second sizes of the first and second types of data. The first size is 120×120 60×60, or 30×30. The second size is fixed to 60×60. In layer 1, because the first type of data have a size of 120×120, the sampling magnification for conversion to the second size is 0.5. In layer 2, because the first type of data have a size of 60×60, the sampling magnification is 1.0. In layer 3, because the first type of data have a size of 30×30, the sampling magnification for conversion to the second size is 2.0.

When the sampling magnification is less than 1.0, that is, in the case of downsampling, the comprehensive control unit performs processing in steps S407 to S414. When the sampling magnification is less than 1.0, because the size of data is reduced by sampling, the data after the sampling is saved in the third memory 208. When the sampling magnification is 1.0 or more, that is, in the case of upsampling, the comprehensive control unit performs processing in steps S415 to S422. When the sampling magnification is 1.0 or more, the image size is enlarged or maintained. Accordingly, the comprehensive control unit saves the data before the sampling in the third memory 208.

In this embodiment, when the size of the first type of data is equal to or smaller than the second size, the sampling magnification is 1.0 or more. Accordingly, the first product-sum operation result is stored unchanged in the third memory 208. When the size of the first type of data is larger than the second size, the sampling magnification is less than 1.0. Accordingly, the first product-sum operation is reduced into the second size and stored in the third memory 208.

Changing the data saved in the third memory 208 in accordance with the sampling magnification in this manner can reduce the capacity of the third memory 208. When always saving data before sampling or data after the sampling, in any case, it is necessary to store data having a size of 120×120, which is the maximum data size before and after sampling. In contrast to this, in this embodiment, because the comprehensive control unit selects and saves data having a smaller size before or after sampling in accordance with the sampling magnification, the third memory 208 may have at least a capacity capable of storing data of 60×60.

In this embodiment, in layer 1, the sampling magnification is 0.5, and processing in steps S407 to S414 is performed. In layer 2, the sampling magnification is 1.0, and processing in steps S415 to S422 is performed. In layer 3, the sampling magnification is 2.0, processing in steps S415 to S422 is performed.

The second product-sum operation unit 206 according to this embodiment concurrently performs a product-sum operation for one intermediate result (output result) with respect to the input of one sampled feature image. When processing layer 1 in FIG. 5, the comprehensive control unit inputs one feature image to the second product-sum operation unit twice. In each of layers 2 and 3, the comprehensive control unit inputs the same feature image twice. Accordingly, the second product-sum operation loop (to be described later), either steps S409 to S414 or steps S416 to S422, repeat twice in each of layers 1, 2, and 3.

Described next is the processing in steps S407 to S414 when the sampling magnification of the sampling processing unit 204 is less than 1.0, that is, in the case of downsampling (image size reduction). First of all, in step S407, the sampling data control unit 207 inputs the first product-sum operation as an output from the branch processing unit 203 to the sampling processing unit 204 and performs downsampling. In step S408, the sampling data control unit 207 saves, in the third memory 208, the data downsampled by the sampling processing unit 204. In step S409, the comprehensive control unit and the sampling data control unit 207 start the second product-sum operation loop. In step S410, the sampling data control unit 207 reads out the first product-sum operation result after the downsampling from the third memory 208, and inputs the result to the second product-sum operation unit 206. In step S411, the comprehensive control unit reads out the second type of data from the second memory 205 and inputs the data to the second product-sum operation unit 206.

In step S412, the second product-sum operation unit 206 calculates the second product-sum operation result. In this case, the second product-sum operation unit 206 calculates the sum of the product-sum operation result calculated by using the first product-sum operation result after downsampling and filter coefficients and the second type of data. In step S413, the comprehensive control unit saves the second product-sum operation result as the second type of data in the second memory 205. In step S414, the comprehensive control unit and the sampling data control unit 207 perform end processing for the second product-sum operation loop. When all the second product-sum operations in the layer in the current loop are completed, the second product-sum operation is terminated. Otherwise, the process returns to step S410 to continue the second product-sum operation.

Described next is the processing in steps S415 to S422 when the sampling magnification of the sampling processing unit 204 is equal to or more than 1.0, that is, in the case of upsampling (image size enlargement). First of all, in step S415, the sampling data control unit 207 saves the first product-sum operation result as an output from the branch processing unit 203 in the third memory 208. In step S416, the comprehensive control unit and the sampling data control unit 207 start the second product-sum operation loop. In step S417, the sampling data control unit 207 reads out the first product-sum operation result from the third memory 208, and inputs the result to the sampling processing unit 204.

In step S418, the sampling processing unit 204 upsamples the first product-sum operation result, and the sampling data control unit 207 inputs the upsampled data to the second product-sum operation unit 206. In step S418, when the sampling magnification is 1.0, the first product-sum operation result may be directly outputted. In step S419, the comprehensive control unit reads out the second type of data from the second memory 205 and inputs the data to the second product-sum operation unit 206. In step S420, the second product-sum operation unit 206 calculates the second product-sum operation result. The second product-sum operation result is the sum of the product-sum operation result calculated by using the first product-sum operation result after upsampling and filter coefficients and the second type of data. In step S421, the comprehensive control unit saves the second product-sum operation result as the second type of data in the second memory 205. In step S422, the comprehensive control unit and the sampling data control unit 207 perform end processing for the second product-sum operation loop. When all the second product-sum operations in the layer in the current loop are completed, the second product-sum operation is terminated. Otherwise, the process returns to step S417 to continue the second product-sum operation.

When the second product-sum operation is completed in the above manner, the process advances to step S423. In step S423, the comprehensive control unit respectively reads out the first and second types of data from the first memory 201 and the second memory 205, and saves the data in the RAM 108. In step S424, the CPU 106 reads out the first and second types of data from the RAM 108, and performs post-processing including activation processing and pooling processing. In step S425, the CPU 106 transfers the post-processing result of the activation processing and the pooling processing to the data processing unit 105. The comprehensive control unit of the data processing unit 105 respectively saves the processing results of the first and second types of data in the first memory 201 and the second memory 205. In step S426, the comprehensive control unit performs end processing for the loop in the layer. If the processing layer becomes the last layer, the concurrent data processing is terminated. Otherwise, the process returns to step S403 to start processing in the next layer.

Processing in the sampling processing unit 204 will be described next. In this embodiment, upsampling is performed based on equation (2).

$$A_{i,j} = B_{[i/r],[j/r]} \quad (2)$$

where B represent a feature image before sampling, A represent a feature image after the sampling, $B_{i,j}$ represents a pixel value at a horizontal position i and a vertical position j on the feature image before the sampling, $A_{i,j}$ represents a pixel value at the horizontal position i and the vertical position j on the feature image after the sampling, r is an integer representing a sampling magnification, with r>=1.0 at the time of sampling, and [x] represents an integer value obtained by rounding down x to the nearest decimal place. According to equation (2), the feature image after the sampling is the one obtained by iterating the pixels of the feature image before the sampling r×r times in the horizontal and vertical directions.

In this embodiment, downsampling is performed based on equation (3).

$$A_{i,j} = B_{r'i+k, r'j+l} \quad (3)$$

where k and l represent the offsets of a sampling position in the horizontal and vertical directions, and r' is an integer representing the reciprocal of the sampling magnification and calculated according to r'=(1/r). According to equation (3), the feature image after the sampling is the one obtained by sampling the feature image before the sampling at intervals r' in the horizontal and vertical directions, with the position (k, l) on the feature image being a starting point.

In the case of the sampling processing method based on equations (2) and (3), there is no need to use a memory for sampling processing, and only the third memory may be used to save the feature image before or after the sampling.

As described above, this embodiment can reduce the memory cost regarding the memory storing data for the second product-sum operation processing repeatedly performed in each layer.

Second Embodiment

The first embodiment has exemplified the case in which sampling is simply performed without performing interpolation processing at the time of downsampling. The second embodiment will exemplify a case in which average value interpolation is performed in the horizontal direction at the time of downsampling. In this embodiment, downsampling is performed based on equation (4) given below. Processing other than downsampling and the arrangement are similar to those according to the first embodiment.

$$A_{i,j} = \frac{1}{r'} \sum_{k=0}^{r'-1} B_{r'i+k, r'j+l} \quad (4)$$

According to equation (4), the feature image after the sampling is the one obtained by performing average value interpolation with a tap count r' for the feature image before the sampling in the horizontal direction and sampling the image at intervals r' in the vertical direction, with the vertical position 1 being a starting point. Assume that data is input to the sampling processing unit in the raster order. In this case, even if downsampling accompanied by average value interpolation in the horizontal direction is performed as in this embodiment, because it is only required to perform cumulative addition of input data, there is no need to use a memory for sampling processing itself.

Accordingly, this embodiment can improve the processing accuracy by performing interpolation processing at the time of downsampling while maintaining the effect of reducing the memory cost in the first embodiment.

Third Embodiment

The second embodiment has exemplified the case in which average value interpolation is performed in the horizontal direction in downsampling processing. In contrast to this, the third embodiment will exemplify the case of using downsampling processing with average value interpolation in the horizontal and vertical directions. The arrangement of a data processing apparatus 100 is the same as that according to the first embodiment, and hence a description of the arrangement will be omitted.

Figure 5:
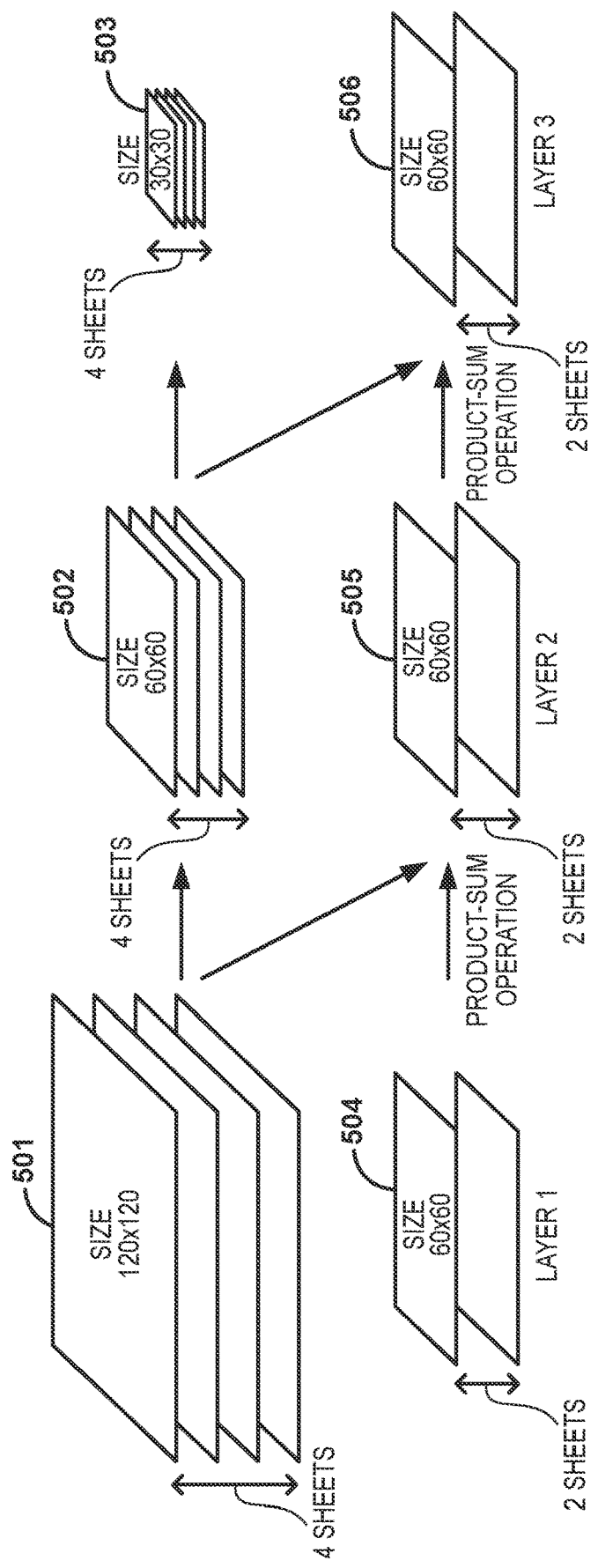
FIG. 5 is a view showing an example of the structure of a processing target layer according to the embodiment.
Figure 6:
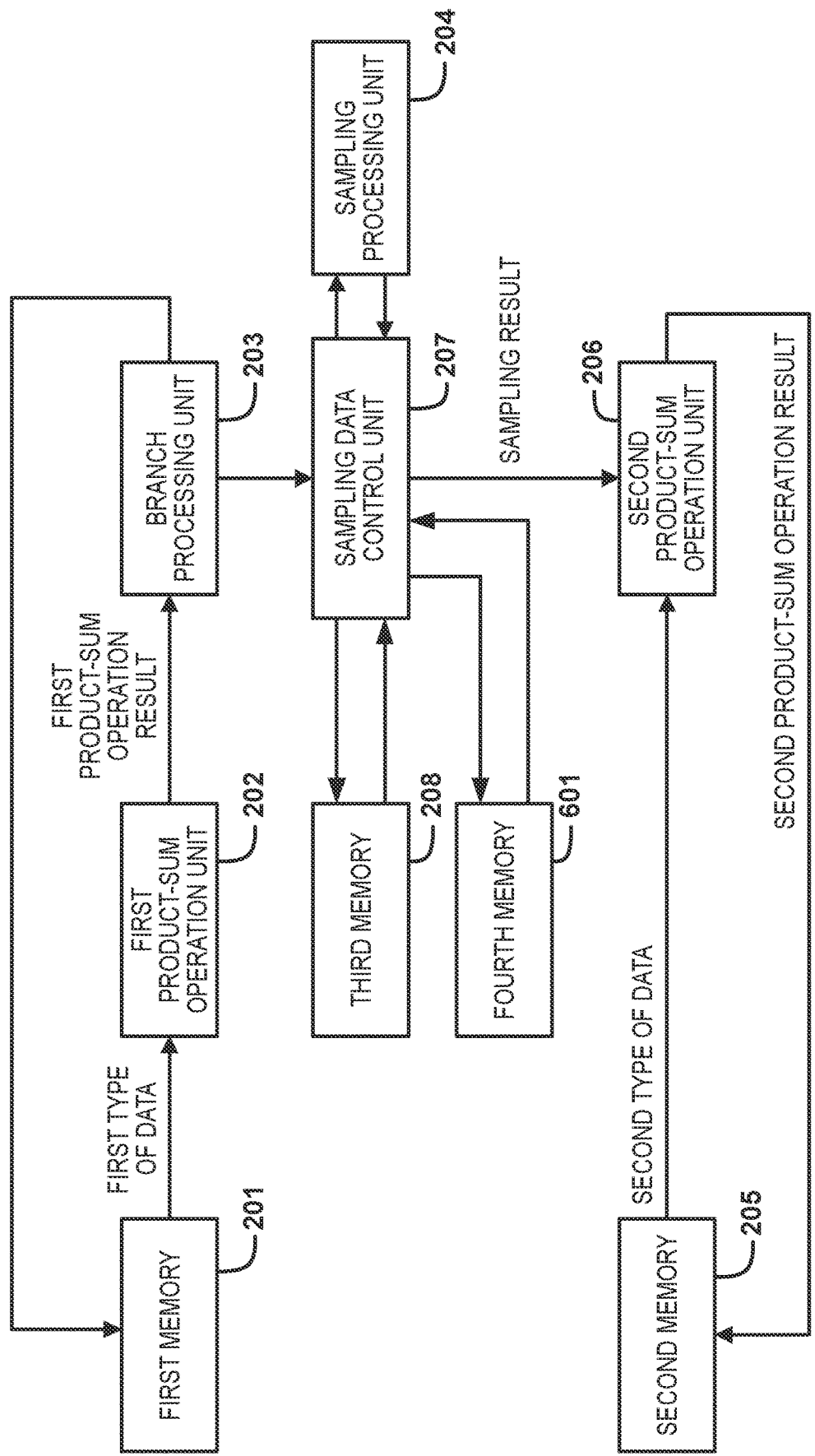
FIG. 6 is a block diagram showing an example of the functional arrangement of a data processing unit 105 according to another embodiment.

FIG. 6 shows an example of the arrangement of a data processing unit 105 according to this embodiment. The embodiment uses a fourth memory 601 having a size of "size in horizontal direction after downsampling x interpolation tap count r'" to perform average value interpolation in the vertical direction at the time of downsampling processing. When layers 1, 2, and 3 shown in FIG. 5 are processed, because it is only required to have feature images of width 60 in number corresponding to a line count of an interpolation tap count of 2, the size of the fourth memory is 60×2=120. Other arrangements are similar to those shown in FIG. 2, and hence corresponding blocks are denoted by the same reference numerals.

Figure 7:
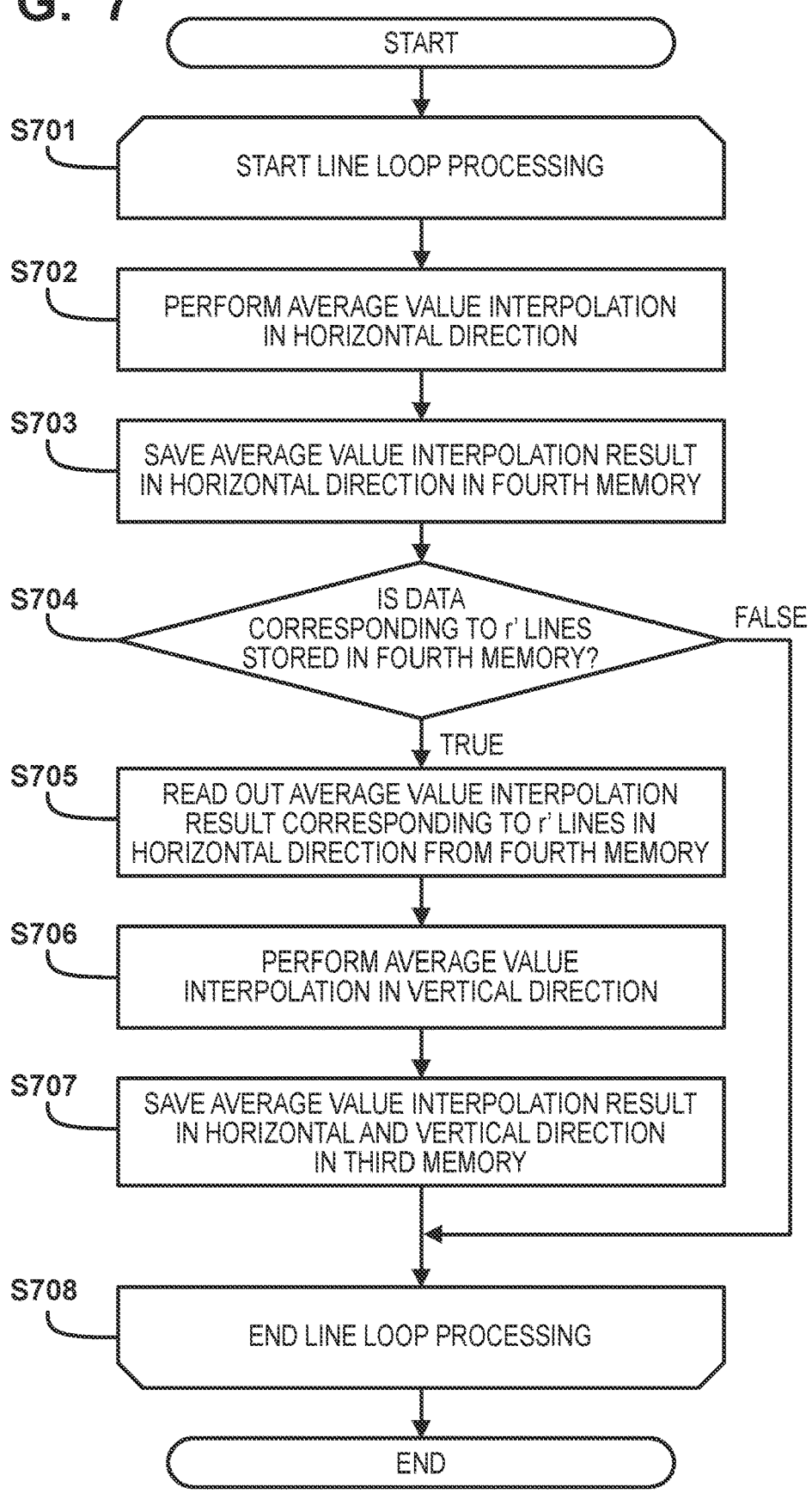
FIG. 7 is a flowchart showing an example of processing according to another embodiment.

A procedure for downsampling processing in the data processing apparatus 100 according to this embodiment will be described with reference to FIG. 7. This processing can be executed upon replacement of steps S407 and S408 in the flowchart of FIG. 4A in the first embodiment with steps S701 to S708.

First of all, in step S701, a sampling data control unit 207 starts line loop processing of sampling of the first product-sum operation result. In step S702, the sampling data control unit 207 inputs the first product-sum operation result to a sampling processing unit 204. The sampling processing unit 204 samples the first product-sum operation result while performing average value interpolation of the result in the horizontal direction. In step S703, the sampling data control unit 207 saves the average value interpolation result in the horizontal direction in the fourth memory 601. If an average value interpolation result corresponding to r' lines is saved in the fourth memory 601, the data on the oldest line is overwritten.

In step S704, the sampling data control unit 207 determines whether data corresponding to r' lines is stored in the fourth memory. If data corresponding to r' lines is stored, steps S705 to S707 (to be described later) are executed. If data corresponding to r' lines is not stored, step S708 is executed. In step S705, the sampling data control unit 207 reads out the average interpolation result corresponding to r' lines in the horizontal direction from the fourth memory, and inputs the result to the sampling processing unit 204. In step S706, the sampling processing unit 204 samples the data sampled in the horizontal direction by performing average value interpolation for the data in the vertical direction. In step S707, the sampling data control unit 207 saves, in a third memory 208, the data sampled upon average value interpolation in the horizontal and vertical direction. In step S708, the sampling data control unit 207 performs end processing for all the lines. If the processing is terminated, the sampling data control unit 207 terminates the processing of sampling the first product-sum operation result and saving the result in the third memory 208. If the processing is not terminated, the process returns to step S702 to continue the processing.

In step S702, downsampling is performed in the horizontal direction based on equation (5). Let A' represent the feature image sampled in the horizontal direction.

$$A'_{i,j} = \frac{1}{r'} \sum_{k=0}^{r'-1} B_{r'i+k,j} \quad (5)$$

In step S706, downsampling is performed in the vertical direction based on equation (6).

$$A_{i,j} = \frac{1}{r'} \sum_{l=0}^{r'-1} A'_{i,r'j+l} \quad (6)$$

According to equations (5) and (6), the feature image after the sampling is the one obtained by averaging the feature image before the sampling r'×r' pixels by r'×r' pixels.

In this embodiment, data downsampled in the horizontal direction is saved in the fourth memory 601. However, the data may be saved in the third memory. When the third memory is to be used in place of the fourth memory, the data processing unit 105 has the arrangement shown in FIG. 2 as in the first and second embodiments. In this case, the size of the third memory is equal to the sum of the size of the third memory according to the first embodiment and the size of the fourth memory according to the third embodiment.

According to the above embodiment, a sampling magnification r at the time of upsampling is an integer, and a reciprocal r' of the sampling magnification at the time of downsampling is an integer. However, sampling with integer magnifications is not exhaustive. It is possible to perform sampling with an arbitrary positive magnification r as indicated by equation (7). According to equation (7), the feature image after the sampling becomes the one obtained by performing nearest neighbor interpolation for the feature image before the sampling with the positive magnification r.

$$A_{i,j} = B_{[i/r+0.5],[j/r+0.5]} \quad (7)$$

In the above embodiment, the sampling method to be used is not specifically limited. Various types of interpolation processing such as bilinear interpolation, bicubic interpolation, and Lanczos interpolation may be executed at the time of downsampling/upsampling.

The above embodiment can further improve the processing accuracy by performing average value interpolation processing in the horizontal and vertical directions at the time of downsampling while maintaining the memory cost reduction effect in the first embodiment.

Figure 8:
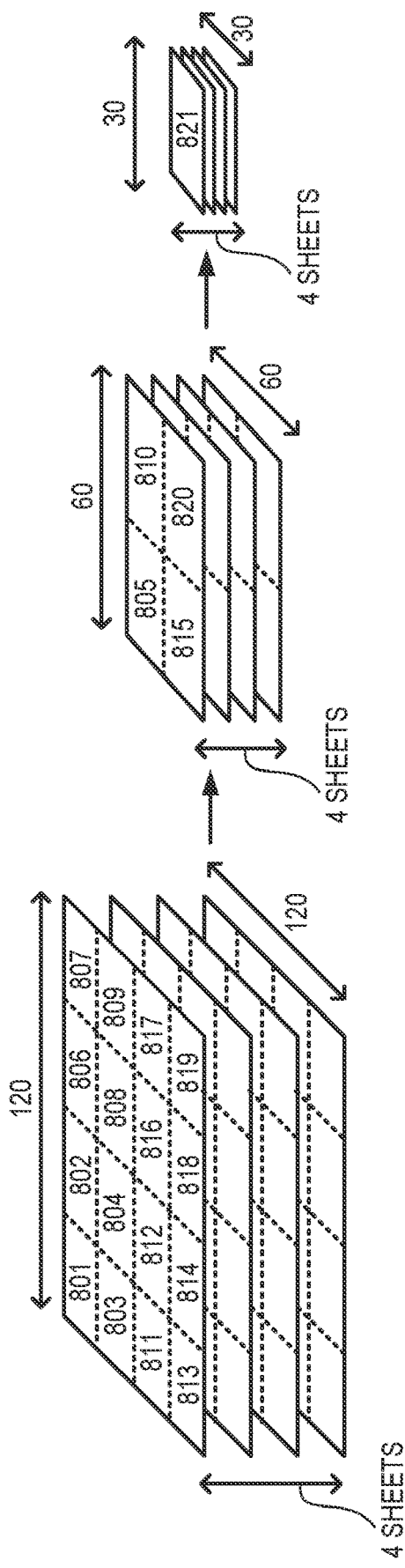
FIG. 8 is a view for explaining a processing sequence according to another embodiment.

Although the above embodiment has exemplified the case in which all feature images in each layer are processed at once, feature images may be divisionally processed. When the network in FIG. 5 is processed, the feature image in each layer can be divided, with a feature image having a size of 30×30 as one unit of processing, and partial feature images 801 to 821 shown in FIG. 8 can be processed in this order. According to the processing sequence in FIG. 8, after the partial feature image 805 is calculated, there is no need to hold the partial feature images 801 to 804. This makes it possible to reduce the memory size required to save feature images as compared with the case of simultaneously processing the entire feature image.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-131395, filed on Jul. 16, 2019, which is hereby incorporated by reference herein in its entirety.

What is claimed is:

1. An image processing apparatus comprising:
one or more processors; and
one or more memories coupled to the one or more processors, the one or more memories including a first, a second, and a third memory, and having stored thereon instructions which, when executed by the one or more processors, cause the apparatus to:
perform a first process on a first image stored in the first memory and obtain a result of the first process in a first size;
perform a conversion to process in which, the result of the first process is converted into a second size, the converted result of the first process in the second size is stored in the third memory, and the result of the first process in the second size is output from the third memory, if the first size is larger than the second size, and, the result of the first process in the first size is stored in the third memory, the result of the first process stored in the third memory is converted into the second size, and the converted result of the first process is output in the second size, if the first size is smaller than the second size; and
perform a second process on the converted result of the first process outputted in the second size and a second image of the second size stored in the second memory, and store a result of the second process in the second memory in the second size.

2. The image processing apparatus according to claim 1, wherein in the conversion process,
if the first size is larger than the second size, the result of the first process is reduced to the second size and a result of the reduction is outputted, and if the first size is smaller than the second size, the result of the first process is enlarged to the second size and outputs a result of the enlargement is outputted.

3. The image processing apparatus according to claim 1, wherein the first process, the conversion process, and the second process are performed in relation to each layer among a plurality of layers.

4. The image processing apparatus according to claim 3, wherein in one layer, result of the first process is output as the first image for a next layer, and the result of the second process is output as the second image for the next layer.

5. The image processing apparatus according to claim 4, wherein the first memory stores the result of the first process in the first size.

6. The image processing apparatus according to claim 5, wherein the instructions, when executed by the one or more processors, further cause the apparatus to make the result of the first process be stored in the first memory and be performed in the conversion process.

7. The image processing apparatus according to claim 1, wherein the first size is set independently for each layer.

8. The image processing apparatus according to claim 1, wherein the first process is performed on the first image stored in the first memory by repeatedly reading out that image from the first memory.

9. The image processing apparatus according to claim 1, wherein the instructions, when executed by the one or more processors, further cause the to perform post-processing on the result of the first process and the result of the second process,
wherein each result the post processing is stored in a corresponding memory among the first memory and the second memory.

10. The image processing apparatus according to claim 9, wherein the post-processing includes activation processing or pooling processing.

11. The image processing apparatus according to claim 1, wherein in the first process, a first product-sum operation is executed for the first image and a filter coefficient.

12. The image processing apparatus according to claim 11, wherein in the second process, a second product-sum operation is performed for a result of the first product-sum operation and a filter coefficient, and an addition of a result of the second product-sum operation and the second image is performed.

13. The image processing apparatus according to claim 12, wherein the first and second product-sum operations are a convolution operation for a convolutional neural network.

14. The image processing apparatus according to claim 1, wherein in the conversion process, if the first size is larger than the second size, the result of the first process is reduced to the second size by downsampling the result of the first process.

15. The image processing apparatus according to claim 14, wherein in the conversion process, the result of the first process is reduced by downsampling including interpolation processing in a horizontal direction.

16. The image processing apparatus according to claim 14, wherein in the conversion process, the result of the first process is reduced by downsampling including average value interpolation processing in a horizontal direction and a vertical direction.

17. The image processing apparatus according to claim 1, wherein in the conversion process, if the first size is smaller than the second size, the result of the first process is enlarged to the second size by upsampling.

18. A method of controlling an image processing apparatus, the method comprising:
performing a first process on a first image stored in a first memory and obtaining a result of the first process in a first size;
performing a conversion process in which, the result of the first process is converted into a second size, the converted result of the first process in the second size is stored in a third memory, and the result of the first process in the second size is output from the third memory, if the first size is larger than the second size, and the result of the first process in the first size is stored in the third memory, result of the first process stored in the third memory is converted into the second size, and the converted result of the first process is output in the second size, if the first size is smaller than the second size; and
performing a second process on the converted result of the first process outputted in the second size and a second image of the second size which is stored in a second memory, and storing a result of the second process in the second memory in the second size.

19. A non-transitory computer-readable storage medium storing one or more program including instructions that, when executed by a processor of an image processing apparatus, causes the processor to perform operations of:
performing a first process on a first image stored in a first memory and obtaining a result of the first process in a first size;
performing a conversion process in which, the result of the first process is converted into a second size, the converted result of the first process in the second size is stored in a third memory, and the result of the first process in the second size is output from the third memory, if the first size is larger than the second size, and if the first size is different from the second size, the result of the first process in the first size is stored in the third memory, the result of the first process stored in the third memory is converted into the second size, and the converted result of the first process is output in the second size, if the first size is smaller than the second size; and performing a second process on the converted result of the first process outputted in the second size and a second image of the second size which is stored in a second memory, and storing a result of the second process in the second memory in the second size.

* * * * *